(12) United States Patent
Reininger et al.

(10) Patent No.: US 10,330,211 B2
(45) Date of Patent: Jun. 25, 2019

(54) PRESSURE REGULATOR

(71) Applicant: TRUMA GERAETETECHNIK GMBH & CO. KG, Putzbrunn (DE)

(72) Inventors: Dennis Reininger, Munich (DE); Ekkehard Gross, Forstinning (DE); Robert Markesic, Unterbiberg (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 15/645,100

(22) Filed: Jul. 10, 2017

(65) Prior Publication Data
US 2018/0010706 A1 Jan. 11, 2018

(30) Foreign Application Priority Data
Jul. 11, 2016 (GB) .................. 1612005.7

(51) Int. Cl.
*G05D 16/10* (2006.01)
*F16K 27/02* (2006.01)
*F16K 31/122* (2006.01)
*F16K 47/02* (2006.01)

(52) U.S. Cl.
CPC ...... *F16K 27/0209* (2013.01); *F16K 31/1221* (2013.01); *G05D 16/106* (2013.01); *F16K 47/023* (2013.01); *Y10T 137/7808* (2015.04)

(58) Field of Classification Search
CPC ... G05D 16/106; F16K 17/34; F16K 27/0209; F16K 31/1221; F16K 47/023; Y10T 137/7808

USPC ..................................... 137/505.25
See application file for complete search history.

(56) References Cited

U.S. PATENT DOCUMENTS

| 2,185,713 | A |   | 1/1940  | Spence  |                    |
|-----------|---|---|---------|---------|--------------------|
| 3,437,109 | A | * | 4/1969  | Egerer  | G05D 16/103        |
|           |   |   |         |         | 137/505.25         |
| 3,695,290 | A |   | 10/1972 | Evans   |                    |
| 3,890,999 | A | * | 6/1975  | Moskow  | G05D 16/103        |
|           |   |   |         |         | 137/484.4          |
| 4,077,425 | A | * | 3/1978  | Drori   | F16K 31/363        |
|           |   |   |         |         | 137/219            |
| 4,300,592 | A |   | 11/1981 | Hartley |                    |
| 4,454,613 | A | * | 6/1984  | Palmer  | B60R 15/00         |
|           |   |   |         |         | 296/171            |
| 4,512,548 | A |   | 4/1985  | Keller  |                    |
| 5,257,646 | A | * | 11/1993 | Meyer   | A01G 25/16         |
|           |   |   |         |         | 137/505.25         |

(Continued)

FOREIGN PATENT DOCUMENTS

| DE | 2504952 A1 | 8/1976 |
| EP | 2151731 A1 | 2/2010 |

(Continued)

*Primary Examiner* — Robert K Arundale
*Assistant Examiner* — Jonathan J Waddy
(74) *Attorney, Agent, or Firm* — McNees Wallace & Nurick LLC

(57) ABSTRACT

A pressure regulator has a housing with an inlet, an outlet and a valve seat. A regulator sleeve is arranged within the housing and defines a flow channel from an upstream end adapted for cooperating with the valve seat towards a downstream end associated with the outlet. A spring biases the regulator sleeve towards the outlet. The downstream end of the flow channel tapers outwardly.

10 Claims, 6 Drawing Sheets

(56) References Cited

U.S. PATENT DOCUMENTS

| | | | | |
|---|---|---|---|---|
| 5,396,918 | A * | 3/1995 | Parker | G05D 16/0608 |
| | | | | 137/14 |
| 5,875,815 | A | 3/1999 | Ungerecht et al. | |
| 6,056,006 | A * | 5/2000 | Hagerty | G05D 16/103 |
| | | | | 137/269 |
| 7,213,611 | B2 * | 5/2007 | Flynn | F16K 17/30 |
| | | | | 137/505.25 |
| 8,678,029 | B2 * | 3/2014 | Ungerecht | G05D 16/0608 |
| | | | | 137/495 |
| 2002/0088495 | A1 * | 7/2002 | Semeia | B63C 11/2209 |
| | | | | 137/505.25 |
| 2005/0126636 | A1 * | 6/2005 | Matsui | G05D 16/106 |
| | | | | 137/505 |
| 2005/0224117 | A1 | 10/2005 | Youngberg et al. | |
| 2006/0137745 | A1 * | 6/2006 | Carnall | F16K 17/046 |
| | | | | 137/505.25 |
| 2006/0196557 | A1 * | 9/2006 | Niki | F16K 15/026 |
| | | | | 137/543.23 |
| 2007/0028966 | A1 * | 2/2007 | Feith | G05D 16/106 |
| | | | | 137/505.25 |

FOREIGN PATENT DOCUMENTS

| | | |
|---|---|---|
| GB | 1016020 A | 4/1963 |
| WO | 2006106373 A1 | 10/2006 |

* cited by examiner

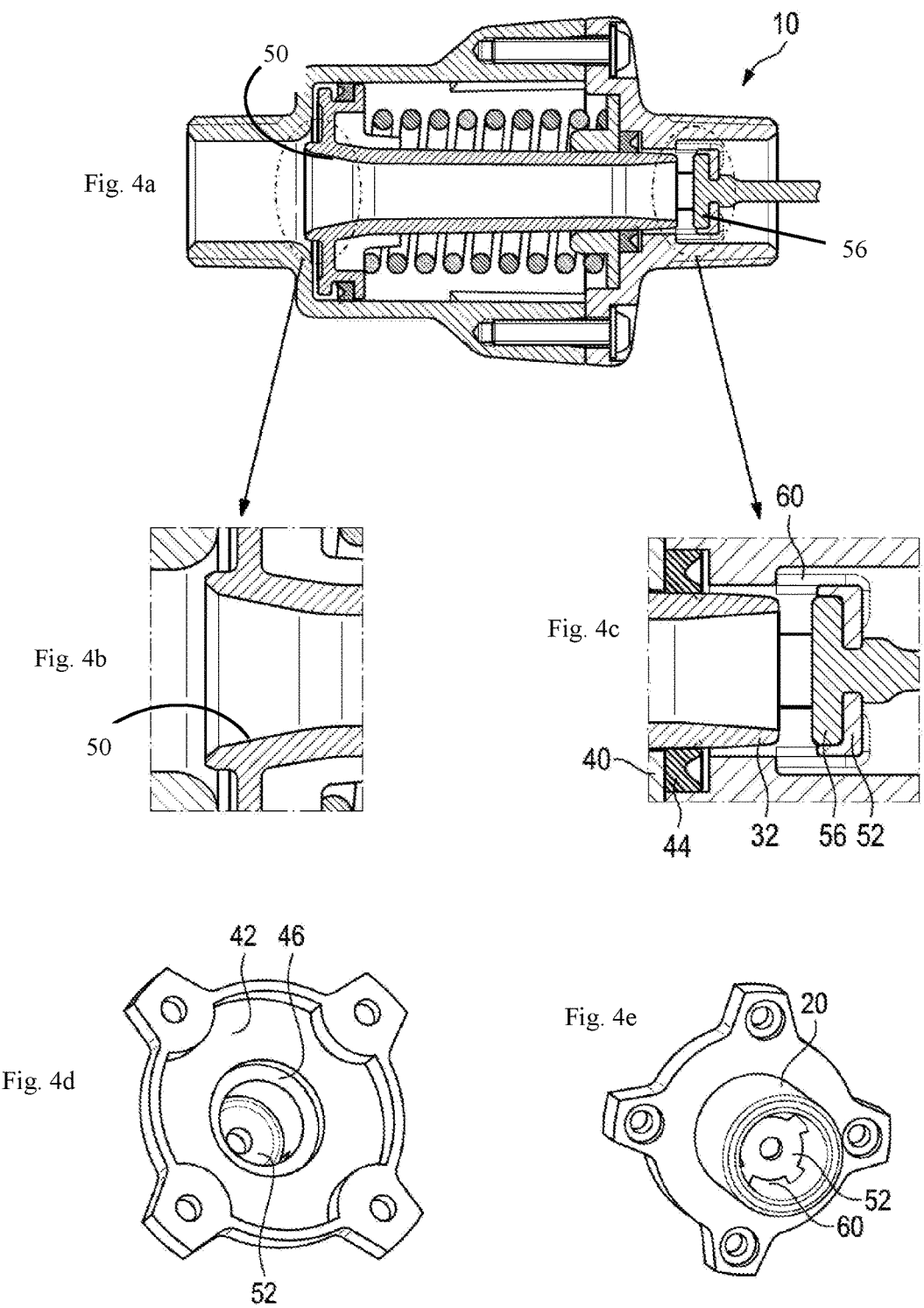

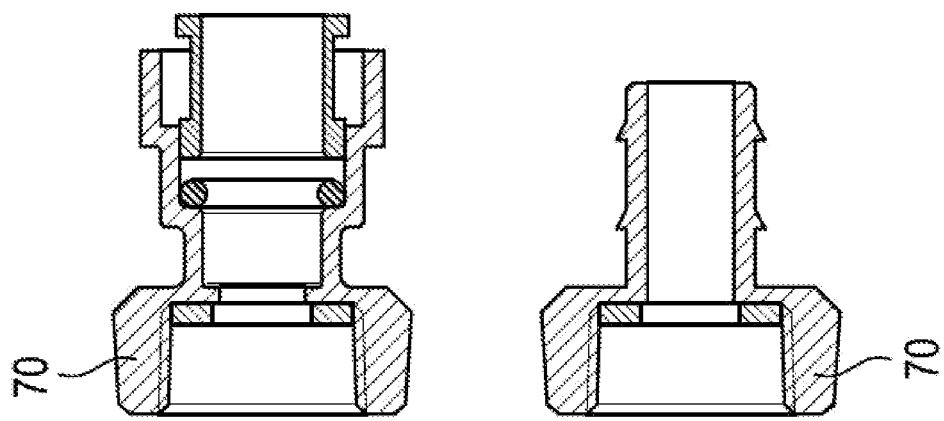
Fig. 5b
Fig. 5c
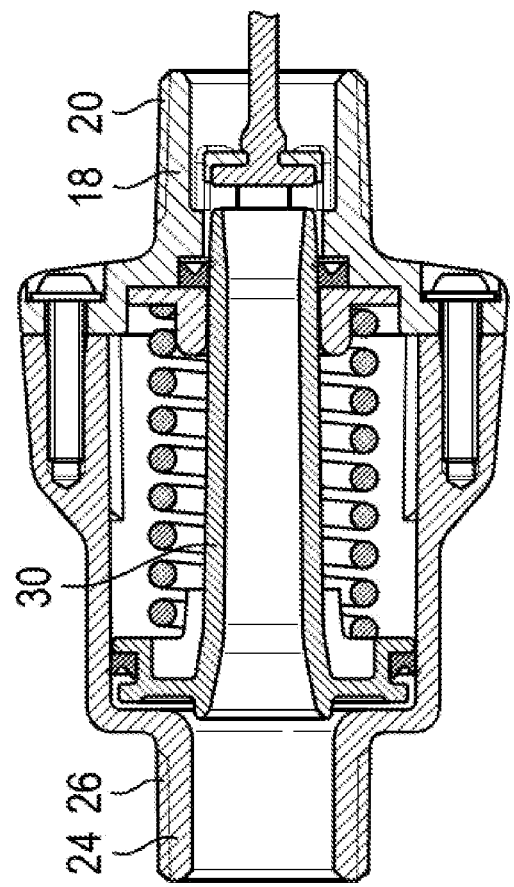
Fig. 5a

PRESSURE REGULATOR

The invention relates to a pressure regulator and to a water supply system for a recreational vehicle.

BACKGROUND OF THE INVENTION

Pressure regulators are generally known in the prior art. They serve for establishing a certain pressure, for example a water pressure at the consumer side of the pressure regulator, this pressure being lower than the water pressure on the supply side.

A frequently used design for such pressure regulator uses a valve element which cooperates with a valve seat. If the pressure on the consumer side is below a certain value, the valve element is lifted from the valve seat so as to allow water to flow from the supply side to the consumer side. When the pressure on the consumer side of the pressure regulator reaches a certain threshold, the valve element is being transferred towards a closed position so that the pressure does not rise further.

The valve element is usually displaced between a closed and an opened position in reaction to the difference between the forces acting on the supply side and the consumer side of the valve element. Thus, no active control and no external drive are necessary for operation of the pressure regulator.

The displacement of the valve element and the flow of water around the valve element however can result in undesired noise which is being generated during operation of the pressure regulator.

The object of the invention is to provide a water pressure regulator which creates less noise during operation.

BRIEF DESCRIPTION OF THE INVENTION

In order to achieve this object, the invention provides a water pressure regulator having a housing with an inlet, an outlet and a valve seat, a regulator sleeve arranged within the housing and defining a water flow channel from an upstream end adapted for cooperating with the valve seat towards a downstream end associated with the outlet, and a spring biasing the regulator sleeve towards the outlet, the downstream end of the flow channel tapering outwardly. It has been found that it is mainly the downstream end of the regulator sleeve where turbulences occur during operation of the pressure regulator. These turbulences can be prevented or at least reduced significantly when the downstream end of the flow channel tapers outwardly so as to ensure that the water flowing through the regulator sleeve properly enters into the outlet of the housing. Furthermore, this results in the pressure at the outlet end of the pressure regulator being more stable.

Preferably, a guiding flange is provided at the downstream end of the regulator sleeve, the guiding flange being provided with a seal adapted for sliding within the housing. The seal can be used for guiding the downstream end of the regulator sleeve within the housing, thereby ensuring a smooth displacement of the pressure regulator and a compensation of tolerances. Further, the seal ensures a reliable sealing action with respect to the exterior of the pressure regulator.

Preferably, the spring abuts at the guiding flange. Thus, no additional components are necessary for transferring the force of the spring into the pressure regulator.

According to the preferred embodiment, a guiding insert is provided at the upstream side of the housing, the guiding insert being associated with a seal adapted for slidably contacting the regulator sleeve. The seal ensures that the water flowing through the regulator sleeve is kept separated from the guiding insert so that no contamination can occur at the interface between the pressure regulator and the guiding insert. Further, the seal ensures a reliable sealing action with respect to the exterior of the pressure regulator.

Preferably, the spring abuts at the guiding insert. It is therefore not necessary to use additional means for fixing the guiding insert in the housing.

Preferably, the housing is formed from a hollow body closed by a cover piece. Accordingly, only a low number of components is necessary, and the mounting process is simplified.

Preferably, the cover piece accommodates the guiding insert. Since the cover piece accommodates also the seal associated with the guiding insert, the interface between the cover piece and the hollow body is not subjected to the water flowing through the regulator sleeve. Thus, no separate seal is necessary for sealing between the hollow body and the cover piece.

Preferably, the seat valve is provided with a sealing insert. The sealing insert guarantees that the regulator sleeve reliably closes the flow cross section through the pressure regulator when the pressure at the outlet side of the pressure regulator exceeds a certain threshold.

In order to simplify the process of mounting the seal on the upstream end of the regulator sleeve, a taper is preferably provided there.

According to an embodiment of the invention, the housing is provided with an external thread at the inlet and the outlet, respectively, so as to allow connecting tubes, hoses, adapters, etc. with low effort.

The invention further provides a water supply system for a recreational vehicle, comprising a water tank, a water pump, a pressure regulator as defined above, and a water tap. The pressure regulator serves for ensuring a generally constant pressure on the consumer side of the water supply system where the water tap is provided, without there being much noise when the regulator sleeve is displaced within the housing of the pressure regulator while the water is flowing through the flow channel within the regulator sleeve.

BRIEF DESCRIPTION OF THE DRAWINGS

The invention will now be described with reference to the enclosed drawings. In the drawings FIG. 1 schematically shows a water supply system using a pressure regulator according to the invention, FIG. 4a shows a cross-section through a pressure regulator, according to an embodiment.

FIG. 4b is an enlarged cross section of FIG. 4a, showing the diverging taper or the flow channel through the cylinder, FIG. 4c is an enlarged cross section of FIG. 4a, showing the valve seat and the sealing disk, FIG. 4d is a perspective view of a guiding insert shown in FIG. 2, FIG. 4e is a perspective view of a valve seat shown in FIG. 2, FIG. 5a is a cross section through the pressure regulator, similar to that shown in FIG. 2, FIG. 5b is a cross section of a first embodiment of an adaptor for use with the pressure regulator of FIG. 5a, FIG. 5c is a cross section of a second embodiment of an adaptor for use with the pressure regulator of FIG. 5a, and FIG. 6 shows a cross section through a pressure regulator according to a second embodiment of the invention.

DETAILED DESCRIPTION OF THE INVENTION

Figure 1:
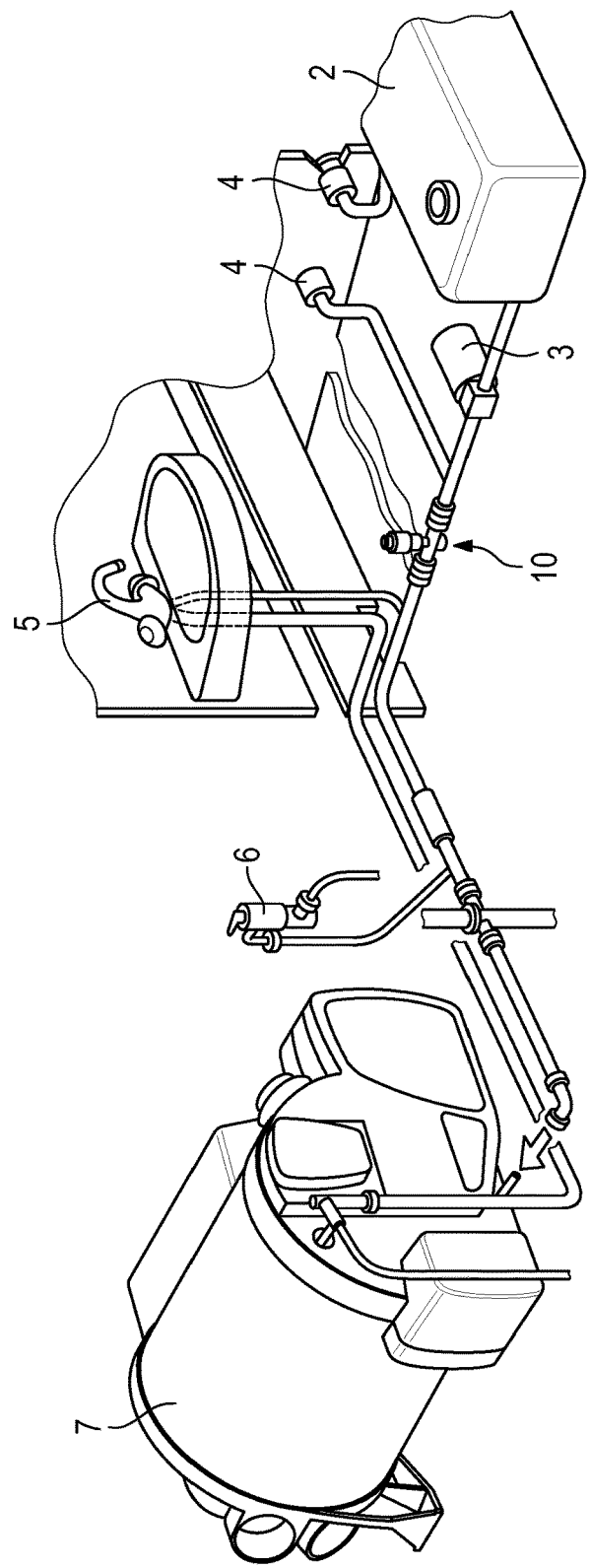
Figure 2:
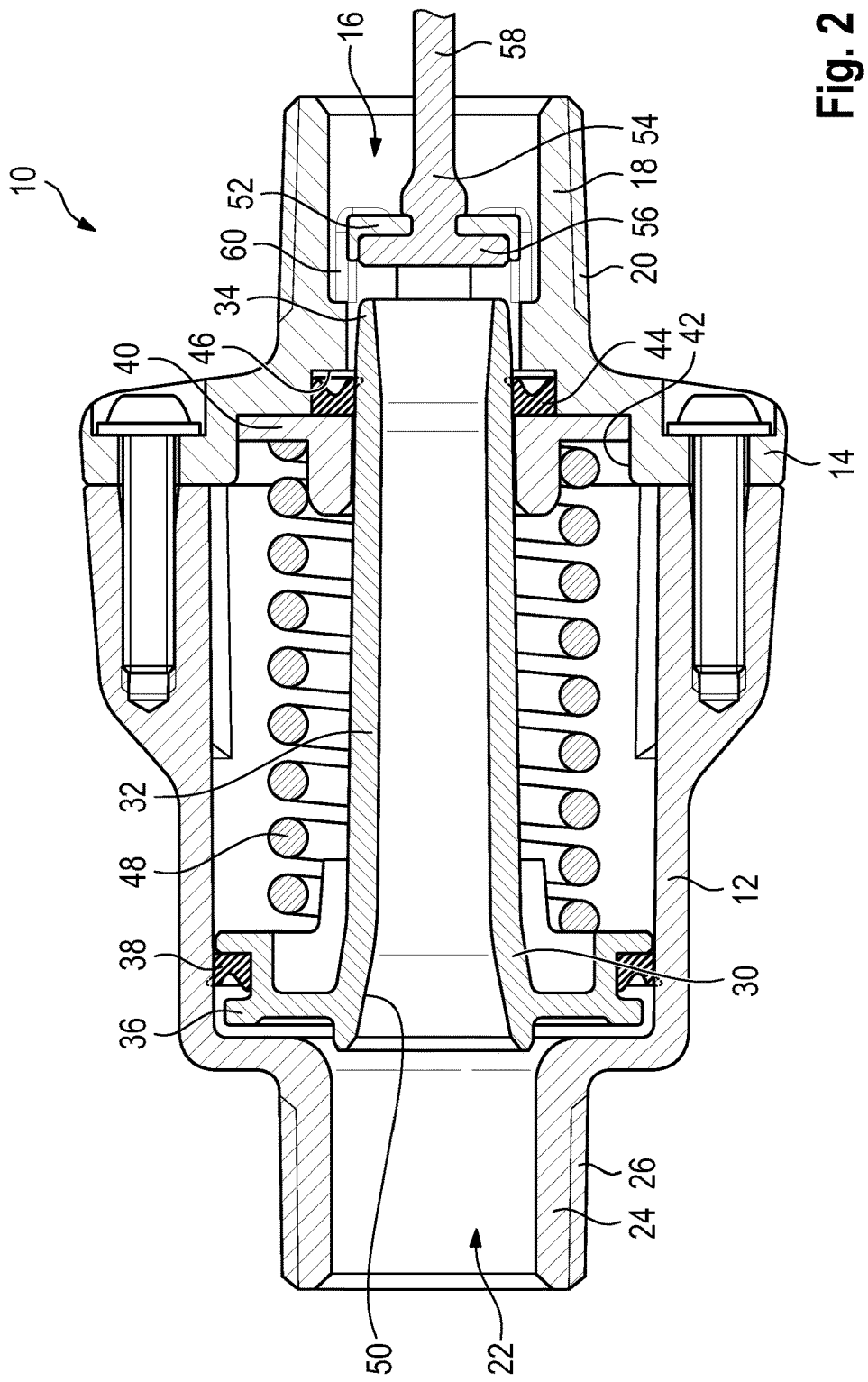
FIG. 2 shows a cross section through a pressure regulator according to a first embodiment of the invention.

In FIG. 1, a water supply system for a recreational vehicle is shown. The recreational vehicle can be a caravan, a trailer, a mobile home, a motorboat, etc.

The water supply system has a water tank 2, a water pump 3, water supplies 4 for either supplying water to water tank 2 or directly into the water supply system. These elements form the supply side of the water supply system.

The water supply system further comprises a water tap 5, a connection 6 towards a shower for example, and a heating system 7. These elements form the consumer side of the water supply system.

Furthermore, a pressure regulator 10 is provided which is arranged between the supply side and the consumer side of the water supply system. The pressure regulator 10 serves for reducing the water pressure which is present on the supply side of the system, to a lower pressure at the consumer side of the system. Should the pressure on the supply side of the system generally correspond to the pressure which is being used on the consumer side, the pressure regulator can also (only) serve for ensuring that a certain pressure threshold is not exceeded.

The design and the operation of the pressure regulator will now be described with reference to FIGS. 2 to 5 in which a first embodiment of pressure regulator 10 is shown.

Pressure regulator 10 comprises a housing formed from a hollow body 12 and a cover piece 14. Cover piece 14 is provided with an inlet 16 which is here formed as a cylindrical stud 18 provided with an external thread 20, and hollow body 12 is provided with an outlet 22. Outlet 22 is also formed as a cylindrical stud 24 provided with an external thread 26.

Arranged within housing 12, 14 is a pressure regulator sleeve 30. It has an elongate, hollow cylinder 32 which defines a flow channel from inlet 16 towards outlet 22.

At its end 34 associated with inlet 16, cylinder 32 is provided with a taper on its outer circumferential surface.

At its end associated with outlet 22, regulator sleeve 30 is provided with a guiding flange 36 whose outer diameter is slightly less than the inner diameter of hollow body 12 of the regulator housing. In a groove on the outer circumference of guiding flange 36, a seal 38 is arranged. It is here a lip seal which contacts the inner surface of hollow body 12.

Seal 38 is adapted for sealing between the outlet side of the pressure regulator where water is present, and the inner space of the housing. Further, seal 38 allows a displacement of regulator sleeve 30 with respect to housing 12, 14.

On the upstream side of regulator sleeve 30, a guiding insert 40 is provided which is slidably arranged on the outer circumference of cylinder 32 of regulator sleeve 30. With its radially outer surface, guiding insert 40 is accommodated within a recess 42 provided in cover piece 14 of the regulator housing.

Associated with guiding insert 40 is a seal 44 which is arranged on the upstream side of guiding insert 40. Seal 44 is arranged in a recess 46 provided in cover piece 14 in the bottom surface of recess 42.

Seal 44 seals between cover piece 14 and the outer surface of cylinder 32 of regulator sleeve 30 while at the same time allowing an axial displacement of regulator sleeve 30.

Within housing 12, 14, a spring 48 is provided which here is a spiral spring. Spring 48 engages with one end at guiding insert 40 which is being pressed into recess 42, and with its opposite end engages at guiding flange 36 of regulator sleeve 30. Thus, regulator sleeve 30 is biased towards outlet 22 while at the same time, guiding insert 40 and seal 44 are held in a mounted condition within cover piece 14.

At its outlet side, the inner surface which defines the flow channel through cylinder 32 is provided with a diverging taper 50. Furthermore, the axial end face of regulator sleeve 30 slightly overlaps with the upstream end of outlet 22.

At the upstream side of pressure regulator 10, a valve seat 52 is provided with which the upstream end of regulator sleeve 30 can cooperate, in particular the axial end face 34 of cylinder 32. Associated with valve seat 52 is a sealing insert 54 which has a sealing disk 56 at which the end face of regulator sleeve 30 can abut so as to close a flow cross section from inlet 16 towards outlet 22. Sealing insert 54 further has a fixation pin 58 which serves for mechanically connecting sealing insert 54 to valve seat 52. To this end, fixation pin 58 has a portion with increased diameter which engages behind an opening in valve seat 52.

Disposed around the circumference of valve seat 52 is a plurality of through openings 60 which allow the water to flow from the upstream side of valve seat 52 towards the downstream side thereof.

Regulator sleeve 30 is axially displaceable within housing 12, 14. Assuming that no pressure is applied to pressure regulator 10, spring 48 displaces regulator sleeve 30 to the left with respect to FIGS. 2 to 4, thus towards the outlet 22.

Figure 3:
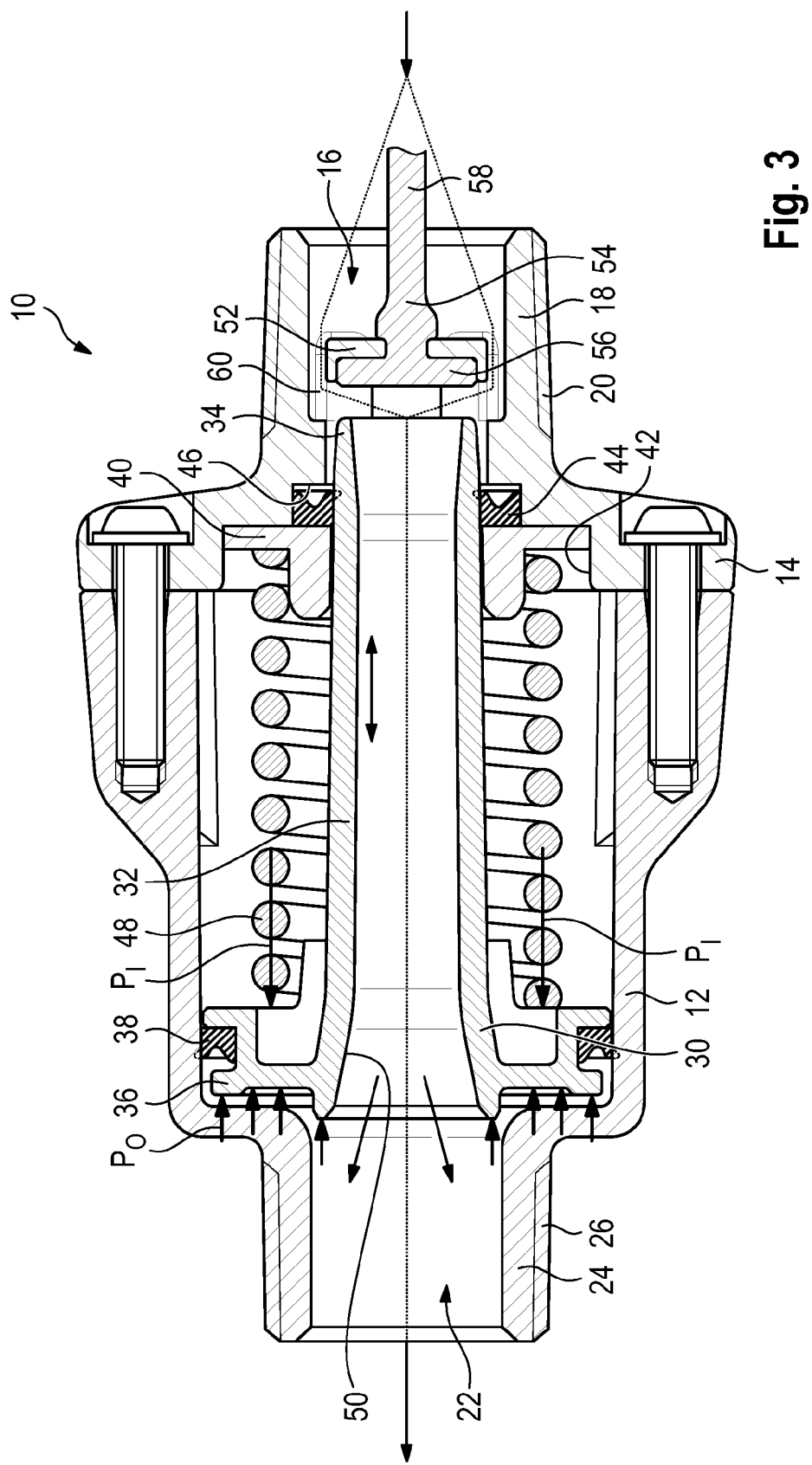
FIG. 3 shows the flow through the pressure regulator and the forces acting on the regulator sleeve of the pressure regulator according to the first embodiment of the invention.

When water flows through the pressure regulator, regulator sleeve 30 is subjected to the combination of the force of spring 48 plus the force resulting from the pressure at the inlet side of the pressure regulator and acting on the cross section of cylinder 32 (in combination symbolized by arrows $P_I$ in FIG. 3) and by the force resulting from the pressure at the outlet side and acting on the cross section of guiding flange 36 (symbolized by arrows $P_O$ in FIG. 3).

When the pressure at the output side rises, regulator sleeve 30 is displaced towards valve seat 52, thereby reducing the available cross section for water flowing from the inlet side towards the outlet side. At a certain point, the forces $P_I$ and $P_O$ are in balance, and the water flows through flow channel from inlet 16 towards outlet 22.

Because of taper 50 at the downstream end of regulator sleeve 30 and because of regulator sleeve 30 slightly protruding into outlet 22, the water flows with very few turbulences from regulator sleeve 30 into outlet 22. Thus, the pressure regulator generates less noise. Further, the outlet pressure maintained by the pressure regulator is very stable.

Another factor which adds to the low noise level of the pressure regulator is that the upstream end of cylinder 32 of regulator sleeve 30 is very precisely centered within cover piece 14. This is due to the fact that recesses 42 and 46 are formed in the same element as valve seat 52. Thus, no mounting tolerances can occur.

As can be seen in FIGS. 5a to 5c, different adapters 70 can be very easily screwed onto external thread 20 of inlet stud 18.

At outlet stud 24, suitable connecting elements can also be very easily attached because of external thread 26.

Figure 6:
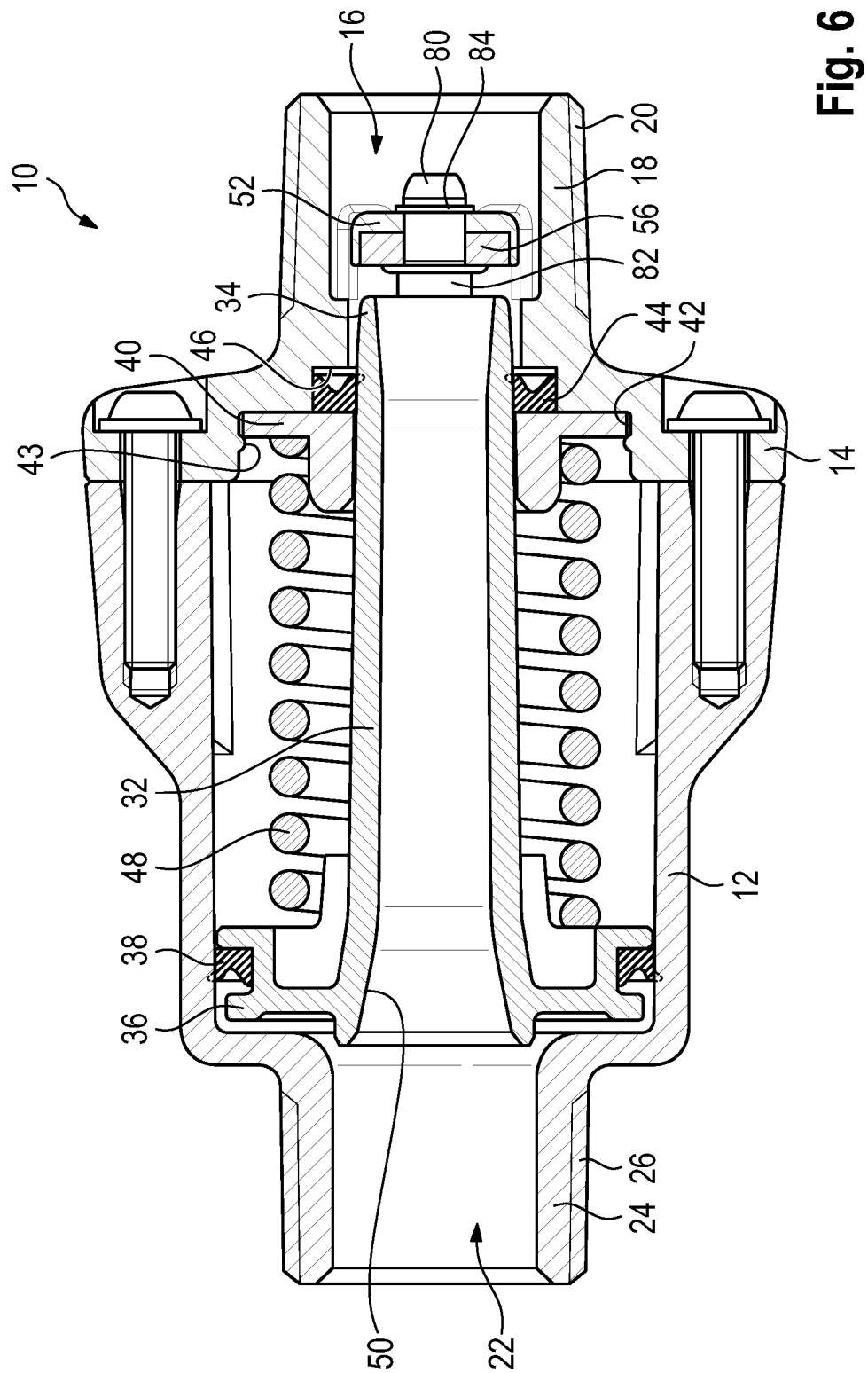

In FIG. 6, a pressure regulator according to a second embodiment is shown. For the elements and features known from the first embodiment, reference is made to the above comments. In the following, only the differences between the first and the second embodiment will be discussed.

The difference between the first and the second embodiments relates to the sealing insert 54 which in the second embodiment is connected to the valve seat by means of a holding pin 80. Holding pin 80 extends through the sealing insert and the valve seat 52 and holds the sealing insert between an enlarged head portion 82 of the holding pin and a circlip 84 elastically latched onto the holding pin.

Another difference is that recess 42 of cover piece 14 is provided with a protrusion 43 behind which guiding insert 40 engages. Guiding insert 40 can be formed as a spring disk.

The invention claimed is:

1. A pressure regulator having a housing which is formed from a hollow body closed by a cover piece which is made from one piece, with an inlet, an outlet and a valve seat, a regulator sleeve arranged within the housing and defining a flow channel from an upstream end adapted for cooperating with the valve seat towards a downstream end associated with the outlet, a spring biasing the regulator sleeve towards the outlet, the downstream end of the flow channel tapering outwardly, wherein a guiding insert is provided at the upstream side of the housing in a recess of the cover piece, the guiding insert being associated with a seal adapted for slidably contacting the regulator sleeve and wherein the recess of the cover piece is provided with a protrusion behind which the guiding insert is engaged such that the guiding insert is arranged between the protrusion and a bottom surface of the recess wherein the protrusion constitutes a single deliberate narrowing of the recess in the cover piece and the guiding insert is in direct contact with the protrusion and is fixed to the cover piece merely by means of the protrusion.

2. The pressure regulator of claim 1 wherein a taper is provided at the upstream end of the regulator sleeve.

3. The pressure regulator of claim 1 wherein a guiding flange is provided at the downstream end of the regulator sleeve, the guiding flange being provided with a seal adapted for sliding within the housing.

4. The pressure regulator of claim 3 wherein the spring abuts at the guiding flange.

5. The pressure regulator of claim 1 wherein the spring abuts at the guiding insert.

6. The pressure regulator of claim 1 wherein the cover piece accommodates the guiding insert.

7. The pressure regulator of claim 1 wherein the valve seat is provided with a sealing insert.

8. The pressure regulator of claim 1 wherein the housing is provided with an external thread at the inlet and the outlet, respectively.

9. Water supply system for a recreational vehicle, comprising a water tank, a water pump, the pressure regulator as defined in claim 1, and a water tap.

10. The pressure regulator of claim 1 wherein an additional recess is provided in the bottom surface of the recess of the cover piece, which has a smaller diameter than the recess of the cover piece and wherein the seal is arranged in the additional recess such that the seal is arranged between a bottom of the additional recess and the guiding insert.

* * * * *